Figure 1:
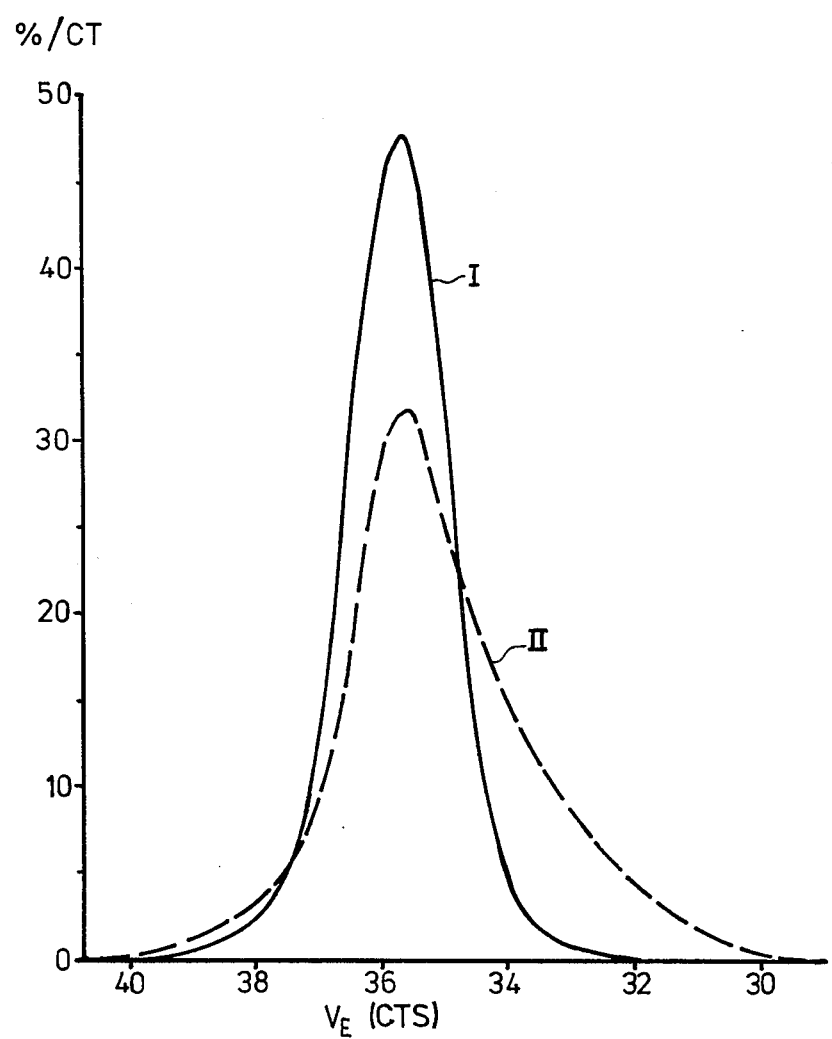

United States Patent [19]

Beck et al.

[11] 4,133,845

[45] Jan. 9, 1979

[54] POLYSEGMENT COPOLYMERS

[75] Inventors: Manfred Beck, Odenthal; Günter Marwede; Rainer Fritz, both of Cologne, all of Fed. Rep. of Germany

[73] Assignee: Bayer Aktiengesellschaft, Leverkusen, Fed. Rep. of Germany

[21] Appl. No.: 863,083

[22] Filed: Dec. 22, 1977

Related U.S. Application Data

[63] Continuation-in-part of Ser. No. 636,933, Dec. 2, 1975, abandoned.

[30] Foreign Application Priority Data

Dec. 5, 1974 [DE] Fed. Rep. of Germany ....... 2457388

[51] Int. Cl.² ........................................... C08F 297/04
[52] U.S. Cl. ................................................. 260/880 B
[58] Field of Search ...................................... 260/880 B

[56] References Cited

U.S. PATENT DOCUMENTS

| | | | |
|---|---|---|---|
| 3,265,765 | 8/1966 | Holden | 260/880 B |
| 3,801,520 | 4/1974 | Hogan | 260/880 B |
| 3,907,929 | 9/1975 | Durst | 260/880 B |
| 3,959,412 | 5/1976 | Oberlin | 260/880 B |

OTHER PUBLICATIONS

Hofmann, "Vulcanization and Vulcanizing Agents", Maclaren & Sons Ltd., London, 1967, p. 79.

*Primary Examiner*—Paul R. Michl
*Attorney, Agent, or Firm*—Connolly & Hutz

[57] ABSTRACT

Polysegment copolymers with thermoelastomeric properties are obtained by a process, wherein block polymers of the idealised form $S_x$-$B_y$, in which S represents structural units derived from styrene, B represents structural units derived from a conjugated diene and x and y are integers, are reacted with sulphur chlorides.

The products according to the invention are suitable for the production of shoe soles, hoses, industrial rubber articles and particularly hot melt adhesives.

6 Claims, 1 Drawing Figure

POLYSEGMENT COPOLYMERS

This is a continuation-in-part of our co-pending application Ser. No. 636,933 filed Dec. 2, 1975 now abandoned.

Linear block polymers of the idealised form $S_x$-$B_y$-$S_z$, in which S represents a structural unit derived from styrene, B represents a structural unit derived from a conjugated diene (butadiene or isoprene) and x, y and z represent integers, are already known. They are used as thermoplastically processible elastomers (Gummi, Asbest, Kunststoffe, 5, 1973, 387).

Block polymers of the idealised form $S_x$-$B_y$ (the symbols having the same meaning as defined above) are also known. Block polymers of this kind are likewise denoted as "diblock copolymers". Their technological value is only small. They are obtained inter alia by polymerising styrene and a conjugated diene (butadiene or isoprene) on lithium catalysts in the form of "living polymers", i.e. polymers which, following the addition of further monomers, continue polymerising in the absence of fresh catalyst, unless they have been previously deactivated.

According to DT-AS 1,245,132, "living diblock copolymers", which have been produced in a certain way, i.e. by polymerising first styrene and then the diene, can be converted by reaction with divinyl benzene into polysegment polymers of the form $S_x$-$B_y$-$C_z$-$B_y$-$S_x$ (C = polymerised radical of the divinyl benzene). It is rather difficult to carry out this process because insoluble gels are readily formed by cross-linking.

The present invention relates to polysegment copolymers with thermoelastomeric properties and to a process for their production which is distinguished by the fact that a block copolymer of the idealised form $S_x$-$B_y$, in which S represents structural units derived from styrene, B represents structural units derived from a conjugated diene and x and y are integers, is reacted with sulphur chlorides optionally in an inert organic solvent.

The integers x and y represent the number of monomer units of styrene and conjugated diene, respectively, which have been incorporated into the block copolymer. As mentioned above the block copolymers may be prepared by anionic polymerisation in the presence of lithium catalysts and x and y can easily be determined for example by the ratio of the moles of monomer used to the moles of lithium catalyst used according to the following formula:

$$\frac{\text{moles of monomer}}{\text{moles of butyl lithium}} = \text{number of monomer units in the block copolymer.}$$

If, for example, 1000 g, which are apporoximately 10 moles of styrene, are polymerised in the presence of 0.01 moles of butyl lithium, about 1000 units of styrene will be incorporated into the block copolymer (x = 1000) and the resulting polystyrene block will have a molecular weight of about 100,000.

In the block copolymers used for the process according to the present invention the number of the structural units derived from styrene, i.e. the integer x is from 10 to 5000, preferably from 50 to 1000, and the number of structural units derived from the conjugated diene, i.e. the integer y is from 190 to 19000, preferably from 380 to 9500.

Whereas the known process for the production of polysegment copolymers can only be carried out with "living polymers", any deactivated diblock copolymers may be used in the process according to the invention. The known process requires an additional difunctional monomer (divinyl benzene) which is incorporated as an additional block in the polyblock copolymers. No such additional block is formed in the process according to the invention. Accordingly, the products obtained are not only chemically different but they also differ in their physical properties.

The diblock copolymers used as the starting material for the process according to the invention may be obtained in known manner by anionic, cationic or radical polymerisation.

In the case of anionic polymerisation, for example on lithium alkyl catalysts, styrene and the conjugated diene, preferably butadiene, may be simultaneously subjected to polymerisation. Alternatively, it is possible to polymerise first the styrene and then the diene, or first the diene and then the sytrene.

Suitable conjugated dienes are, in particular, acyclic dienes containing from 4 to 8 carbon atoms, for example butadiene, isoprene and piperylene. Butadiene and isoprene are preferably used.

In the context of the invention, styrene and structural units derived from styrene also include nucleus-substituted styrenes (for example vinyl toluene or chlorostyrene) and styrenes alkylated in the side chain, for example α-methyl styrene.

The production of diblock copolymers by anionic polymerisation is known. Polymerisation is preferably carried out in hydrocarbons as solvents, whilst lithium compounds, for example lithium alkyls, are generally used as catalysts. One of the two monomers may be polymerised first and the second added on completion of polymerisation. However, it is also possible to introduce both monomers simultaneously. In this case, the diene polymerises first and forms a polydiene block which only contains small quantities of styrene. After the diene has been used up the styrene polymerises and forms a polystyrene block which contains practically no diene. The steric structure of the polydiene block may be influenced by cocatalysts, such as for example ethers or amines.

This procedure results initially in the formation of a living polymer which is deactivated by the addition of proton-active agents, such as water, ethyl alcohol, acids or amines. The diblock copolymer thus obtained may be isolated and subsequently subjected to the process according to the invention. Alternatively, the deactivated solution obtained may be directly treated with the sulphur chlorides. It is also possible not to deactivate the diblock polymer and instead to treat the reaction solution directly with the sulphur chlorides. In this case, at least the same molar quantity of sulphur chloride, based on the lithium, is used. Disulphur dichloride is preferably used as the sulphur chloride.

The diblock polymers used preferably contain styrene and/or α-methyl styrene as the hard component with a glass transition temperature above 10° C. The soft component (glass transition temperature below 0° C.) is preferably formed by diene rubbers, such as butadiene or isoprene. The diene component is predominantly present in the form of 1,4-bonds. However, it may also contain up to 80% of 1,2-bonds.

The molecular weight of the styrene block may be between 1000 and 500,000, preferably between 5000 and 100,000 whilst the molecular weight of the rubber block should be between 10,000 and 1,000,000 and preferably between 20,000 and 500,000.

The reaction of sulphur chlorides with diene polymers is known. It is used to improve "cold flow", especially in the production of cis-1,4-polybutadiene, the other properties of the rubber remaining unaffected. Surprisingly, it has now been found that the reaction of diblock copolymers of styrene and butadiene, which have hardly any technological value, with sulphur chlorides results in the formation of polymers which can be processed by processes of the kind normally used for thermoplasts and which at the same time show elastomeric properties. The products obtained in accordance with the invention are thermoplastic and may be processed in the absence of additives in injection-moulding machines, extruders or the like. At room temperature they show typical rubber properties, i.e. a high modulus, high elongation, hardness and elasticity. Whereas triblock copolymers of dienes and styrene have the serious disadvantage of undergoing a drastic deterioration in hardness, elasticity and moduli at elevated temperature, these values are reduced to a very much lesser extent in the polymers according to the invention. They also have superior qualities for the the production of hot melt adhesives.

The products obtained by coupling with the sulphur chlorides are characterised by predominant bonding of the diene components of two or more diblock molecules of the structure $S_x$-$B_y$. Triblocks $S_x$-$B_z$-$S_x$ are formed in the first stage, their middle block $B_z$ being formed from the two blocks $B_y$ of the starting components by bonding through sulphur bridges. $B_z$ is branched with a high degree of probability.

The cross-linking does not stop after the reaction between two molecules. By determination of the molecular weight of the coupled products, it is found that in general 2 to 14 and in highly coupled products up to about 20 diblock copolymers have been coupled with one another. (As is known in the art, the molecular weight can be determined by evaluation of the so-called ZIMM-diagrams). Accordingly, in the middle block $B_z$ of the coupled products z is an integer of from $2y$ to $14y$, and z may amount up to $20y$ in highly coupled products.

As can be shown by gel permeation chromatography, a very wide distribution spectrum is formed. In the accompanying drawing (a gel permeation chromatogram), the abscissa represents the elution volume and the ordinate represents the relative concentration. I = diblock butadiene/styrene, II = I coupled with disulphur dichloride). This wide distribution is responsible for the excellent processing properties of the products obtained.

It is surprising that the products obtained show excellent solubilities in hydrocarbon solvents. They are soluble even in chloroform and, in some cases, even in ethyl acetate.

The high solubility, even of extremely high molecular weight fractions, in aromatic solvents and chloroform, indicates a more spherical structure of the molecules. This is also indicated by the low viscosity number of the products. This structure distinguishes the polymers produced in accordance with the invention both from triblock copolymers of the type SBS as well as from polymers produced by reacting living diblock copolymers with divinyl benzene.

Solvents suitable for use in the process according to the invention include any solvent in which the diblock copolymers are soluble. It is preferred to use the solvents in which the diblock polymers are formed, for example aliphatic hydrocarbons, cyclic hydrocarbons, aromatic solvents or mixtures thereof with ethers or cyclic ethers. If the diblock polymers have been isolated in the form of solids by any given process, it is also possible to use other solvents for the coupling reaction providing they do not react with or result in the decomposition of the sulphur chlorides.

The sulphur chlorides are preferably added in the form of a solution in the same solvent as that of the diblock. They may also be added in undiluted form as liquids.

The reaction temperatures may be in the range of from −20 to +150° C., although the reaction is preferably carried out at room temperature. The reaction time ranges from 5 to 120 minutes, preferably from 15 to 60 minutes, depending upon the reaction temperature.

The quantity in which the crosslinking agent is used depends on the required degree of cross-linking. The crosslinking agent may be used, for example, in quantities of from 0.5 to 20 mMol and preferably in quantities of from 3 to 6 mMol per 100 g of rubber.

The process may also be carried out in the absence of solvents. In this case, the sulphur chlorides are either previously added in solution to the diblock copolymer and the mixture subsequently isolated by the usual methods, or they are added in concentrated form or in the form of a concentrated solution in a mixer. Suitable mixers are, for example, two-roll or multi-roll stands, internal mixers or screw extruders.

The process may be carried out either continuously or in batches. In its continuous form, the reaction may be carried out in reactor cascades or in tube reactors.

The polymer is recovered from its solution either by precipitation with an organic non-solvent or by coagulation with hot water. A stabiliser may be added to the polymer before this stage.

The products obtained in accordance with the invention are suitable for the production of shoe soles, hoses and industrial rubber articles.

The polymers may be processed in the absence of additives, although it is also possible to add conventional rubber additives, such as carbon black, light fillers, dyes, pigments or processing oils.

The products according to the invention are particularly suitable for the production of hot melt adhesives. Hot melt adhesives are known in the art and are in general mixtures of suitable elastomers and certain resins having melting points of approximately 100° C. like coumarone indene resins, resins of modified colophonic and resinic acids, synthetic hydrocarbon resins and polyterpene resins.

In the following examples, the percentages are by weight.

EXAMPLE 1

22.4 liters of dry toluene are initially introduced into a 60 liter vessel in the absence of air and moisture. 3.12 kg of dry styrene are added and polymerisation is initiated by the addition of 31.2 mol of 2M n-butyl lithium. The temperature is kept between 30 and 50° C. After 3 hours, 3.12 kg of butadiene are added and the mixture is left to polymerise for 15 hours at the same temperature. 0.4% of $S_2Cl_2$ (based on the rubber) dissolved in toluene is then added, and the mixture is left to react for 30 minutes at room temperature. The solution is then stabilised by the addition of 0.5% of di-tert-butyl methyl phenol and the rubber is isolated by precipitation with methanol. An almost colourless product is obtained after drying at 70° C. in a vacuum drying cabinet. Sheets produced from this product by pressing for 10 minutes at 170° C. were tested in comparison with a standard commercial-grade thermoplastic rubber (trade name Cariflex TR 4122).

|  | Produced in accordance with Example 1 | Standard commercial product |
|---|---|---|
| F strength (MPa) | 6.6 | 7.2 |
| D elongation (%) | 530 | 970 |
| M modulus 300 (MPa) | 4.1 | 1.6 |
| M modulus 500 (MPa) | 6.5 | 2.6 |
| H hardness 20°/70° (Shore A) | 94/91 | 71/45 |
| H hardness 100°/120°/150° | 42/17/4 | 7/1/- |
| E elasticity 20°/7° | 46/39 | 38/30 |
| Str. structure according to Pohle (N) | 94 | 97 |

It can be seen that the product according to the invention is superior to the standard commercial product in numerous aspects, but especially in the modulus values. In addition, the product shows greater hardness, coupled with higher elasticity, that the standard commercial product. The dependence upon temperature of hardness is of particular significance. The product according to the invention shows a considerably lower reduction in hardness with increasing temperature. It also shows advantages during extrusion. Whereas the profile obtained with the standard commercial-grade product was slightly rough and showed signs of injection swelling, the product according to the invention showed a smooth profile without any injection swelling.

EXAMPLE 2

1.1 liters of dry toluene were introduced into a 2 liter autoclave in the absence of air and moisture. 192 g of dry butadiene are added and polymerisation is initiated by the addition of 1.3 ml of 2 M sec-butyl lithium. The temperature is kept at 40 to 60° C. After 3 hours, 127 g of styrene are added, and the mixture is left to polymerise for another 3 hours. The living polymer is deactivated by the addition of 0.32 g of 2,6-di-tert-butyl-4-methyl phenol in toluene. 0.4% of $S_2Cl_2$ is then added, based on solid rubber, and the mixture is left reacting for 60 minutes. After isolation by coagulation with steam, the product is dried at 70° C. in a vacuum drying cabinet. Sheets pressed from the polymer (10 minutes, 170° C.) show the following properties: F 6.9 MPa, D 475%, M 300% 4.2 MPa, H (23°, 70°, 100°, 120°, 150°) 83, 70, 52, 30, 12; E 23°/70° 47/38, Str 100, abrasion (40/60 emery) 135/68 mm³. The standard commercial comparison material (Cariflex TR 4122) showed the following values: F 6.3 MPa, D 990%, M (300%) 3.5 MPa, H (23°, 70°, 100°, 120°, 150°) 76, 51, 6, 1, 0; E (23°/70°) 40/41, Str. 88, abrasion (40/60 emery) 277/170.

EXAMPLE 3

1.1 liters of dry toluene are introduced into a 2 liter autoclave in the absence of air and moisture. 91 g of dry styrene are added and the polymerisation reaction is initiated by the addition of 3.6 ml of 2 M n-butyl lithium. After 3 hours at 30–40° C., dry isoprene (260 g) is added and polymerisation continued at 40 to 60° C. After 3 hours, 0.5% of 2,6-di-tert-butyl-4-methyl phenol (based on rubber) is added and the product is precipitated with methanol ($\eta$) = 0.72 dl/g. After drying, the polymer is dissolved in toluene and freed from traces of moisture by introducing nitrogen at 70° C. After cooling to room temperature, 1.0% of disulphur dichloride (based on rubber) is added, followed by stirring for 60 minutes. The product is isolated in the same way as described above, an elastic, somewhat tacky polymer being obtained. It has an ($\eta$)-value of 1.59 dl/g.

EXAMPLE 4

A somewhat tacky polymer is obtained in the same way as described in Example 3, except that a mixture of 195 g of butadiene and 65 g of isoprene is used. Before treatment with 1 phr of $S_2Cl_2$, the polymer has an ($\eta$)-value of 0.61. After the reaction, its ($\eta$)-value is 0.87.

EXAMPLE 5

As described in Example 3 91 g of dry styrene are added under nitrogen to 1.1 liters of dry toluene and the polymerisation reaction is initiated by the addition of 3.4 ml of a 2 M $\eta$-butyl lithium solution in hexane. Polymerisation is carried out with stirring for 2 hours at 40° C. Then 260 g of isoprene are added and polymerisation is continued for a further 3 hours at 40° C. The monomer conversion is more than 99%. Polymerisation is stopped by the addition of 1 g 2, 6-di-tert.-butyl-4-methylphenol in toluene.

To equal parts of the resulting solution $S_2Cl_2$ was added in form of a 10% by weight solution in toluene in the absence of moisture. The different quantities of $S_2Cl_2$ added are given in table 1 below. After stirring for 2 hours at room temperature the resulting products are precipitated and isolated by pouring the solutions in methanol.

A preliminary test with the elastomers is carried out by examination of their fusibility in admixture with the glycerol ester of hydrogenated colophonic acid which is a suitable resin for the production of holt melt adhesives. A styrene-isoprene diblock copolymer which has not been reacted with $S_2Cl_2$ is used for the blank test E. For comparison test F is carried out with a commercially available styrene-isoprene-styrene triblock copolymer (Cariflex TR 1107) which has been reacted with $S_2Cl_2$ as described above.

Table 1

| Test | amount of $S_2Cl_2$ [m mole/100 g of rubber] | fusibility |
|---|---|---|
| A | 3.7 | homogeneous melt |
| B | 7,4 | " |
| C | 22.0 | No homogeneous melt |
| D | 30.0 | " |
| E | without | homogeneous melt |
| F | 3.7 | " |

Test samples A, B, E and F which are suitable because of their fusibility are further examined to determine their qualities as hot melt adhesives. For comparison test G is carried out with the triblock copolymer Cariflex TR 1107 which has not been reacted with $S_2Cl_2$. The tests are carried out with 1:1 by weight admixtures of the block copolymers and glycerol ester of hydrogenated colophonic acid. The adhesive power is determined immediately and after six months. Additionally the maximum load for 3 hours at 50° C. is determined and the time of a firm adhesion with a load of 40 g at 70° C. The results are summarised in table 2 below.

Table 2

| Test | adhesion power immediately | [p/cm] 6 months | maximum load [3 h/50° C] | adhesion time [40 g/70° C] | viscosity [P] at 180° C |
| --- | --- | --- | --- | --- | --- |
| A | 2350 | 1700 | 600 g | >180 min | 120 |
| B | 1940 | 2200 | 300 g | >180 min | 320 |
| E | no adhesion | — | — | — | — |
| F | 2340 | 2000 | 100 g | 79 min | 160 |
| G | 2270 | 1800 | 250 g | 68 min | 360 |

The comparison with the commercial-grade styrene-isoprene-styrene triblock copolymer (test G) shows the superiority of the products according to the invention especially in the sharpened test of the adhesive power at elevated temperature (70° C.). The triblock copolymer fails already after 68 minutes whereas test samples A and B withstand a load of 40 g for more than 3 hours.

The tests further show that a triblock copolymer which has been reacted with $S_2Cl_2$ (test F) results in a hot melt adhesive of significantly lower adhesion power at 50° and 70° C. than a diblock copolymer. This demonstrates that only the reaction of diblock copolymers with low amounts of $S_2Cl_2$ yields technically useful products of high quality (tests A and B). With high amounts of $S_2Cl_2$ (>20 m mole/100 g of rubber) no useful products are obtained (tests C and D). They do not yield a homogeneous melt with the resin and are not suitable for the production of hot melt adhesives. A diblock copolymer which has not been reacted with $S_2Cl_2$ (test E/yields a homogeneous melt which, however, has no adhesive power.

We claim:

1. Polysegment copolymers consisting of coupled diblock copolymers produced by coupling deactivated diblock copolymers of styrene and a conjugated diene of the idealized form $S_x$-$B_y$, wherein the styrene block S has 10 to 5,000 structural units x and the diene block B has 190 to 19,000 structural units y, with 0.5–20 mMole of sulphur chlorides per 100 grams of diblock copolymer.

2. Polysegment copolymers according to claim 1 in which the diene block B represents structural units derived from isoprene.

3. A polysegment copolymer according to claim 1 which consists of from 2 to 14 diblock copolymers coupled by sulphur chlorides.

4. A process for the production of polysegment copolymers according to claim 1 wherein diblock copolymers of the idealised form $S_x$-$B_y$ are reacted with sulphur chlorides in an inert organic solvent.

5. A process, as claimed in claim 4, wherein the sulphur chlorides are used in quantities of from 3 to 6 mMol per 100 of diblock copolymer.

6. A process, as claimed in claim 4, wherein disulphur dichloride is used as the sulphur chloride.

* * * * *